US010907503B2

United States Patent
Nolcheff et al.

(10) Patent No.: US 10,907,503 B2
(45) Date of Patent: *Feb. 2, 2021

(54) COMPRESSORS WITH INTEGRATED SECONDARY AIR FLOW SYSTEMS

(71) Applicant: HONEYWELL INTERNATIONAL INC., Morris Plains, NJ (US)

(72) Inventors: Nick Nolcheff, Chandler, AZ (US); Jong Lee, Tempe, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 230 days.

This patent is subject to a terminal disclaimer.

(21) Appl. No.: 16/108,907

(22) Filed: Aug. 22, 2018

(65) Prior Publication Data

US 2018/0347401 A1    Dec. 6, 2018

Related U.S. Application Data

(63) Continuation of application No. 13/182,976, filed on Jul. 14, 2011, now Pat. No. 10,072,522.

(51) Int. Cl.
*F01D 25/24* (2006.01)
*F01D 9/04* (2006.01)
(Continued)

(52) U.S. Cl.
CPC ............ *F01D 25/24* (2013.01); *F01D 9/04* (2013.01); *F02C 9/18* (2013.01); *F04D 27/023* (2013.01);
(Continued)

(58) Field of Classification Search
CPC ........ F01D 9/04; F01D 25/24; F04D 27/0215; F04D 27/023; F04D 27/0238; F04D 29/545; F02C 9/18
See application file for complete search history.

(56) References Cited

U.S. PATENT DOCUMENTS

| 2,837,270 A | 6/1958 | Chapman |
| 3,966,355 A | 6/1976 | Pierpoline |
| (Continued) | | |

FOREIGN PATENT DOCUMENTS

| EP | 1288466 A1 | 3/2003 |
| EP | 1659293 A2 | 5/2006 |
| (Continued) | | |

OTHER PUBLICATIONS

Extended EP Search Report for Application No. 12166089.8-1610 dated Dec. 8, 2017.

*Primary Examiner* — Justin D Seabe
*Assistant Examiner* — Jesse M Prager
(74) *Attorney, Agent, or Firm* — Lorenz & Kopf, LLP (57) ABSTRACT

A compressor includes a rotor platform; a rotor blade; and a casing having an inner surface surrounding the tip and spaced radially outwardly from the tip to define a gap. A secondary air flow system includes a bleed inlet configured to remove secondary air flow from the primary air flow; an injection opening disposed in the inner surface of the casing upstream of the bleed inlet; an accessory conduit; and a plenum fluidly coupled to the bleed inlet, the injection opening, and the accessory conduit. The bleed inlet and plenum at least partially define a secondary air flow path such that a first portion of the secondary air flow is directed in through the bleed inlet, through the plenum, and out through the injection opening and a second portion of the secondary air flow is directed in through the bleed inlet, through the plenum, and out through the accessory conduit.

19 Claims, 4 Drawing Sheets (51) Int. Cl.
  *F02C 9/18* (2006.01)
  *F04D 27/02* (2006.01)
  *F04D 29/54* (2006.01)
(52) U.S. Cl.
  CPC ....... *F04D 27/0238* (2013.01); *F04D 29/545* (2013.01); *F04D 27/0215* (2013.01)

(56) References Cited

U.S. PATENT DOCUMENTS

| | | |
|---|---|---|
| 4,222,703 A | 9/1980 | Schaum et al. |
| 4,844,689 A | 7/1989 | Seed |
| 5,203,162 A | 4/1993 | Burge |
| 5,340,271 A | 8/1994 | Freeman et al. |
| 5,351,478 A | 10/1994 | Walker et al. |
| 5,477,673 A | 12/1995 | Blais et al. |
| 5,531,565 A | 7/1996 | Meindl et al. |
| 5,586,859 A | 12/1996 | Nolcheff |
| 6,585,482 B1 | 7/2003 | Liotta et al. |
| 6,732,530 B2 | 5/2004 | Laurello et al. |
| 7,074,006 B1 | 7/2006 | Hathaway et al. |
| 7,090,462 B2 | 8/2006 | Martin et al. |
| 7,264,441 B2 | 9/2007 | Loudet |
| 7,458,779 B2 | 12/2008 | Bil et al. |
| 2003/0035719 A1 | 2/2003 | Wadia et al. |
| 2005/0106009 A1 | 5/2005 | Cummings et al. |
| 2006/0104805 A1 | 5/2006 | Gummer |
| 2008/0232960 A1 | 9/2008 | Guemmer |
| 2009/0047117 A1 | 2/2009 | Xu |
| 2009/0252596 A1 | 10/2009 | Guemmer |
| 2010/0111688 A1 | 5/2010 | Nolcheff et al. |
| 2011/0072829 A1 | 3/2011 | Bil et al. |

FOREIGN PATENT DOCUMENTS

| | | |
|---|---|---|
| EP | 2000649 A2 | 12/2008 |
| GB | 2270118 A | 3/1994 |

COMPRESSORS WITH INTEGRATED SECONDARY AIR FLOW SYSTEMS

PRIORITY CLAIM

This application is a continuation of U.S. patent application Ser. No. 13/182,976, filed Jul. 14, 2011, which is now U.S. Pat. No. 10,072,522, and which is hereby incorporated by reference.

STATEMENT REGARDING FEDERALLY SPONSORED RESEARCH OR DEVELOPMENT

This invention was made with Government support under W911W6-08-2-0001 awarded by the US Army. The Government has certain rights in the invention.

TECHNICAL FIELD

The present invention generally relates to compressors of gas turbine engines, and more particularly relates to integrated secondary air flow systems of compressors in gas turbine engines.

BACKGROUND

A gas turbine engine may be used to power various types of vehicles and systems. A gas turbine engine may include, for example, five major sections: a fan section, a compressor section, a combustor section, a turbine section, and an exhaust nozzle section. The fan section induces air from the surrounding environment into the engine and accelerates a fraction of this air toward the compressor section. The remaining fraction of air induced into the fan section is accelerated through a bypass plenum and exhausted through the mixer nozzle. The compressor section raises the pressure of the air it receives from the fan section and directs the compressed air into the combustor section where it is mixed with fuel and ignited. The high-energy combustion products then flow into and through the turbine section, thereby causing rotationally mounted turbine blades to rotate and generate energy. The air exiting the turbine section is exhausted from the engine through the exhaust section.

In some engines, the compressor section is implemented with one or more axial and/or centrifugal compressors. A compressor typically includes at least one rotor blade that is rotationally mounted on a hub within a casing. From an efficiency perspective, it is advantageous to operate the engine with as high a pressure as possible. However, in some conventional engines, operating at high pressures may increase the likelihood of a stall condition. Engine stall is a phenomenon that occurs as a result of certain engine operating conditions and, if not properly addressed, may adversely impact engine performance and durability. Other causes of engine stall may include overpressurization or flow distortions in areas upstream or downstream of the rotors. In many conventional systems, the compressor may operate in a less than optimally efficient manner to maintain adequate stall margin.

In addition to compressing air for the combustor section, the compressor also supplies compressed air to other portions of the engine for pneumatic power, buffering, or cooling. This air is typically bled upstream or downstream from the rotors and may further complicate engine stall and efficiency considerations. In some conventional systems, removal of this air may complicate stall margin considerations.

Accordingly, it is desirable to provide improved compressors that increase the stall margin while not adversely affecting engine performance. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a compressor for a gas turbine engine is provided. The compressor includes a rotor platform; a rotor blade extending radially outwardly from the rotor platform, the rotor blade including a pressure sidewall and a circumferentially opposing suction sidewall extending in a radial direction between a root and a tip and in an axial direction between a leading edge and a trailing edge; and a casing having an inner surface surrounding the tip and spaced radially outwardly from the tip to define a gap between the casing and the tip, the casing and the rotor platform defining a primary air flow path between the casing and the rotor platform to direct a primary air flow in a direct air in a downstream direction. A secondary air flow system includes a bleed inlet disposed in the inner surface of the casing downstream of the rotor blade and configured to remove secondary air flow from the primary air flow; an injection opening disposed in the inner surface of the casing upstream of the bleed inlet; an accessory conduit configured to be fluidly coupled to an accessory system of the gas turbine engine; and a plenum fluidly coupled to the bleed inlet, the injection opening, and the accessory conduit. The bleed inlet and plenum at least partially define a secondary air flow path for the secondary air flow such that a first portion of the secondary air flow is directed in through the bleed inlet, through the plenum, and out through the injection opening and a second portion of the secondary air flow is directed in through the bleed inlet, through the plenum, and out through the accessory conduit.

In accordance with another exemplary embodiment, a gas turbine engine assembly includes a compressor section with a rotor platform; a rotor blade extending radially outwardly from the rotor platform, the rotor blade including a pressure sidewall and a circumferentially opposing suction sidewall extending in a radial direction between a root and a tip and in an axial direction between a leading edge and a trailing edge; a casing having an inner surface surrounding the tip and spaced radially outwardly from the tip to define a gap between the casing and the tip, the casing and the rotor platform defining a primary air flow path between the casing and the rotor platform to direct a primary air flow in a direct air in a downstream direction; and an exhaust section fluidly coupled to the compressor section. A secondary air flow system includes a bleed inlet disposed in the inner surface of the casing downstream of the rotor blade and configured to remove secondary air flow from the primary air flow; an injection opening disposed in the inner surface of the casing upstream of the bleed inlet; an exhaust conduit fluidly coupled to the exhaust system; and a plenum fluidly coupled to the bleed inlet, the injection opening, and the exhaust conduit. The bleed inlet and plenum at least partially define a secondary air flow path for the secondary air flow such that a first portion of the secondary air flow is directed in through the bleed inlet, through the plenum, and out through the injection opening and a second portion of the secondary air flow is directed in through the bleed inlet, through the plenum, and out through the exhaust conduit to the exhaust section.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, exemplary embodiments discussed herein provide an integrated secondary air flow system in a compressor of a gas turbine engine. The secondary air flow system removes air from the primary air flow into a plenum as secondary air flow, which in turn feeds an exhaust system, an accessory system, and injection slots. The injection slots may provide air flow to the gap between the rotor blades and the casing, thereby preventing or mitigating gap vortices that contribute to a stall condition. The accessory system may use the secondary air flow for pneumatic power or cooling. The portion of secondary air flow dumped into the exhaust system further mitigates stall conditions. As such, the secondary air flow system increases the stall margin within the compressor while providing air flow to the accessory systems.

Figure 1:
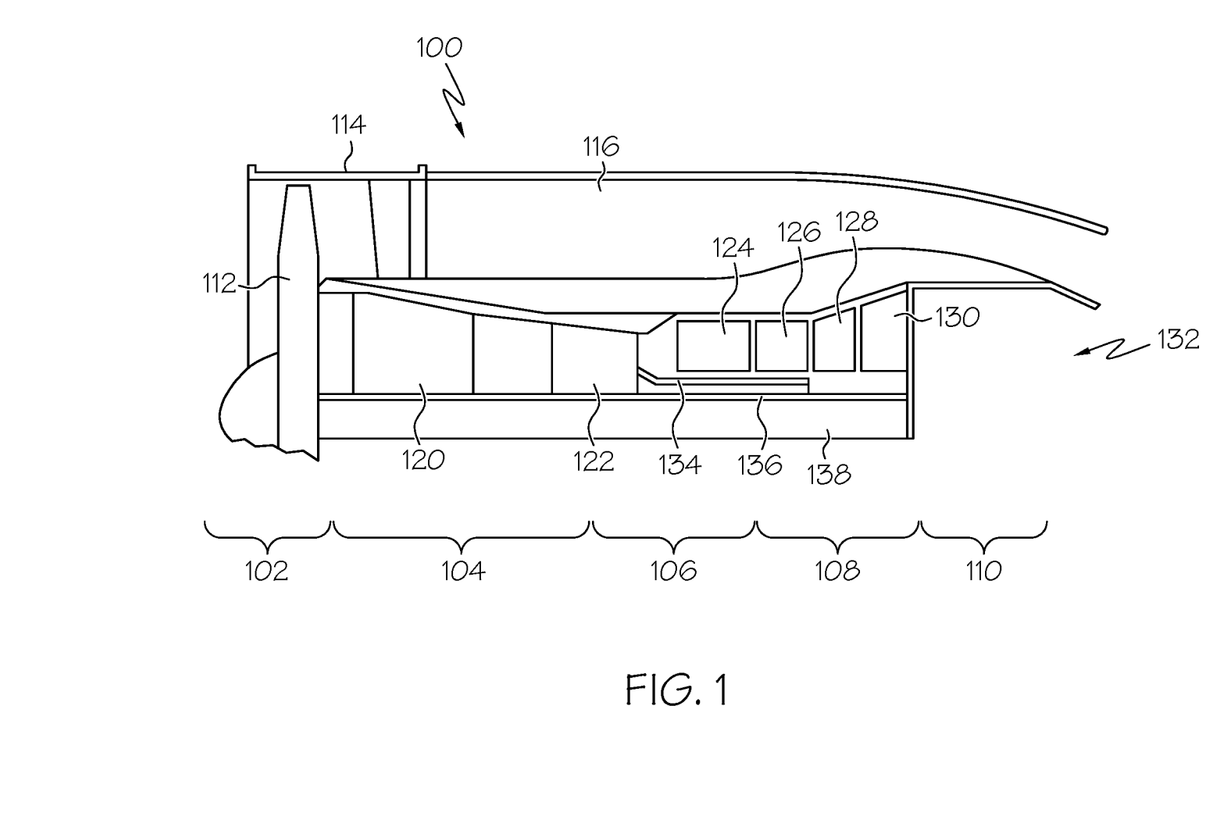
FIG. 1 is a cross-sectional view of a gas turbine engine in accordance with an exemplary embodiment.

FIG. 1 is a cross-sectional view of a gas turbine engine 100 in accordance with an exemplary embodiment that may incorporate the secondary air flow system described below. The gas turbine engine 100 includes a fan section 102, a compressor section 104, a combustion section 106, a turbine section 108, and an engine exhaust section 110. The fan section 102 includes a fan 112 mounted in a fan case 114 that induces and accelerates ambient air into the compressor section 104. In one exemplary embodiment, the gas turbine engine 100 is a turbo-fan engine that provides mechanical, electrical and/or pneumatic power to an aircraft or other type of vehicle. In other embodiments, the engine 100 may be a turbo-shaft engine such as an auxiliary power unit (APU). In such embodiments, one or more of the other sections 102, 106, 108, and 110 may be omitted.

The compressor section 104 includes at least one compressor and, in the depicted embodiment, includes an intermediate pressure compressor 120 and a high pressure compressor 122 that raise the pressure of the air and directs it into the combustion section 106. In the combustion section 106, which includes a combustor 124, the high pressure air is mixed with fuel and combusted. The combusted air is then directed into the turbine section 108. In the depicted embodiment, the combustor 124 is an annular combustor, although other configurations may be provided. The turbine section 108 includes a number of turbines disposed in axial flow series, including a high pressure turbine 126, an intermediate pressure turbine 128, and a low pressure turbine 130. The combusted air from the combustion section 106 expands through each turbine 126, 128, and 130, causing them to rotate. As the turbines 126, 128, and 130 rotate, each respectively drives equipment in the gas turbine engine 100 via concentrically disposed shafts or spools 134, 136, and 138. The air is then exhausted through the engine exhaust section 110.

Figure 2:
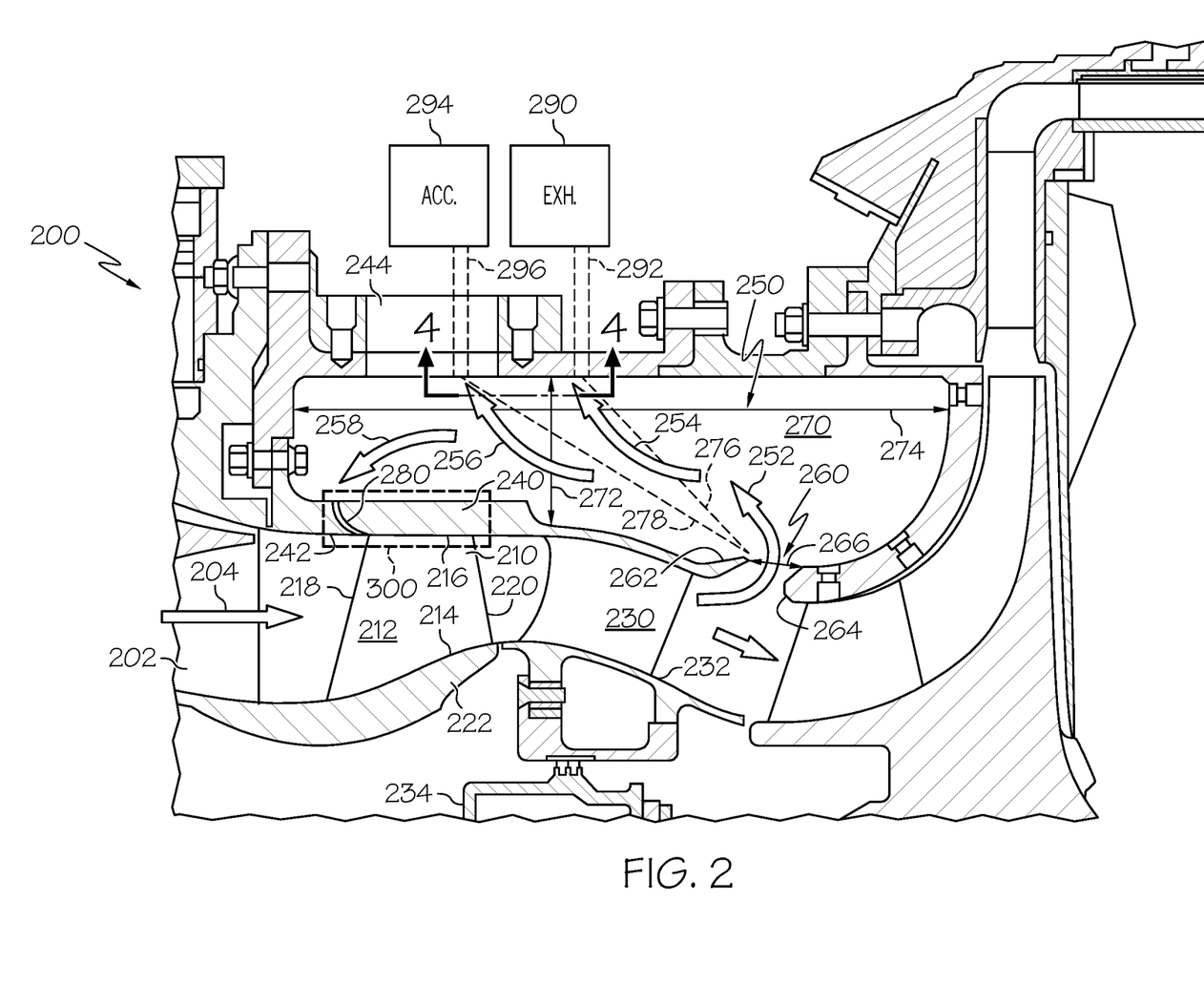
FIG. 2 is a partial cross-sectional view of a compressor of the gas turbine engine of FIG. 1 in accordance with an exemplary embodiment.

FIG. 2 is a partial cross-sectional view of a compressor 200 that may be incorporated, for example, into the compressors 120 and 122 discussed above in reference to FIG. 1 or any type of compressors. In the depicted embodiment, the compressor 200 includes one or more rotor assemblies that each include a number of rotor blades 210 (one of which is shown) mounted on platform 222, which in turn, is coupled to a hub 234 mounted on a shaft (not shown). The rotor blades 210 extend in a radial direction and are generally spaced apart from one another around the circumference of the hub 234. Each rotor blade 210 includes a generally concave, pressure sidewall 212 and a circumferentially opposite, generally convex suction sidewall (not shown). The two sidewalls extend radially between a root 214 and an outer tip 216 and axially between a leading edge 218 and a trailing edge 220. The rotor blade 210 is typically solid and has a plain, generally flat tip 216, although other configurations may be provided.

The compressor 200 further includes one or more stator assemblies with stator vanes 230 (one of which is shown) mounted a platform 232. A generally circumferentially arcuate casing 240 surrounds the rotor blades 210 and stator vanes 230 to at least partially define the primary (or compressor mainstream) air flow path 202 with the platforms 222 and 232. The portion of casing 240 that is in closest proximity to the tip 216 is referred to as an end wall 242. During operation, the rotor blades 210 rotate and draw primary (or mainstream) air flow 204 through the compressor 200. As the primary air flow 204 travels axially downstream between the rotor blades 210 and the stator vanes 230, it is pressurized and directed through additional compressor or fan stages, as desired, for further compression.

As mentioned above, a stall margin associated with the compressor 200 corresponds to the difference in the mass flow rate and pressure rise of the primary air flow 204 between normal operating conditions and stall operating conditions. It is generally desirable to increase stability, either to enable higher performance at normal operating conditions or to increase the margin of safety for existing conditions. An example of a compressor scenario that may contribute to a stall condition is pressure variation or distortion along the primary air flow path 202. Such pressure variations may arise in a number of contexts. As another example, overpressurization or instability downstream of the rotor blades 210 may block or inhibit the primary air flow 204 and further contribute to stall conditions in conventional compressors. Removal of bleed air for pneumatic power or cooling of accessory systems may further complicate design considerations. In many compressors, it has been shown that leakage of air in the gap between the tip 216 of the rotor blade 210 and the end wall 242 of the casing 240 results in a low momentum, vertical flow structure that reduces the stability of the compressor and increases its sensitivity to the above-mentioned destabilizing conditions. It is generally advantageous to reduce this gap in order to reduce leakage flow and, therefore, enhance both the efficiency and stall margin of the compressor. However, the minimum clearance at which the compressor can operate is influenced by several factors, including manufacturing capabilities, variations in operating conditions, material selection and engine architecture. Therefore, as described below, other approaches to mitigating the influence of these tip leakage flows and other destabilizing conditions may be introduced to enhance the performance of the compressor.

As described in greater detail below, the secondary air flow system 250 addresses each of these situations in an integrated arrangement to thus result in increased stall margins while additionally providing air flow to other portions of the aircraft. In general, the secondary air flow system 250 includes a bleed inlet 260, a plenum 270, and injection openings 280 (one of which is shown). As shown in FIG. 2, the secondary air flow system 250 communicates (e.g., receives or provides air flow) with the primary air flow path 202, as well as an exhaust system 290 via an exhaust conduit 292 and an accessory system 294 via an accessory conduit 296. Each of the components of the secondary air flow system 250 will be introduced below prior to a more complete description of the integrated functions.

The bleed inlet 260 is defined or otherwise disposed in the casing 240 and includes an upstream edge 262 and a downstream edge 264 that define a generally axial width 266. In one exemplary embodiment, the bleed inlet 260 is axi-symmetric about the primary air flow path 202, although other arrangements may be provided. Typically, the bleed inlet 260 is a full annular slot, rounded apertures, or the like, and bridges or other structures may be provided for assembly and support. The upstream edge 262 may be angled to facilitate air flow into the bleed inlet 260 and then into the plenum 270.

The plenum 270 is generally defined by casing 240 and an outer wall 244 and extends in an axial direction at least between the bleed inlet 260 and the injection openings 280. As described in greater detail below, the plenum 270 is in fluid communication with the bleed inlet 260, the injection openings 280, the exhaust conduit 292, and the accessory conduit 296. As shown in FIG. 2, the plenum 270 may include a radial height 272 and an axial width 274 and extends axi-symmetrically about the primary air flow path 202. As shown in the view of FIG. 2 and described in further detail below, the radial height 272 may decrease in a fore direction (e.g., to the left in FIG. 2), although other configurations may be provided.

The exhaust conduit 292 is schematically shown extending between the plenum 270 and the exhaust system 290. In one embodiment, the exhaust system 290 may include an exhaust valve and educator that direct air overboard the aircraft as necessary or desired. In particular, the exhaust system 290 coupled to the exhaust conduit 292 may be the engine exhaust section 110 (FIG. 1) or merely a system or conduit that dumps the air overboard the aircraft. The accessory conduit 296 is also schematically shown and extends between the plenum 270 and the accessory system 294. The accessory system 294 may be any system that receives air and/or pneumatic power from the compressor 200. For example, the accessory system 294 may be a cooling system or a buffering system for a pump or other components. In some embodiments, more than one accessory conduit 296 and more than one accessory system 294 may be provided.

The injection openings 280 are generally embodied as discrete slots defined in the casing 240 between the plenum 270 and the primary air flow path 202. As discussed in greater detail below, the injection openings 280 may be positioned just upstream of the rotor blade 210 or just downstream of the forward edge of the rotor blade 210. The injection openings 280 may be angled to direct air from the plenum 270 into a gap between the rotor blade 210 and the casing 240. The injection openings 280 may have curved or straight walls and may further have curved or angular edges at the inlet or outlet of the respective opening 280. In one exemplary embodiment, the injection openings 280 may have a reduced area at the outlet (e.g., adjacent the primary air flow path 202) relative to the inlet (e.g., adjacent the plenum 270). Such a reduced area may accelerate air flow therethrough.

FIG. 2 depicts the injection openings 280 as extending through the wall of the casing 240 that separates the primary air flow path 202 from the plenum 270 (e.g., the wall parallel to a longitudinal axis of the compressor 200). However, in other embodiments, the injection openings 280 may be located in other positions, such as from an inlet or off-take from the upstream end wall of the plenum 270 and then through the casing 240 to an outlet at or upstream of the rotor blade 210. Any suitable configuration or arrangement may be provided.

As introduced above, the secondary air flow system 250 is an integrated system that performs a number of functions in the compressor 200. During operation, the secondary air flow system 250 functions to 1) increase the stall margin of the compressor 200 by reducing pressure variations at both upstream and downstream positions of the rotor blades 210; 2) remove air from the primary air flow path 202; 3) direct air as necessary from the compressor 200 to the accessory system 294; and 4) direct air as necessary from the compressor 200 to the exhaust system 290.

Particularly, the bleed inlet 260 functions to remove air from the primary air flow path 202 as secondary (or bleed) air flow 252. The secondary air flow 252 is removed for the reasons discussed above, such as to reduce pressure variations in the primary air flow path 202 and to feed the accessory system 294 and the injection openings 280. The pressure variations at the bleed inlet 260 may be due to a number of factors, including pressure gradients between the typically high pressure areas downstream of the rotor blades 210 and other portions of the compressor with low pressure areas. Other reasons for pressure variations may include operating conditions, such as air flow variations between starting conditions and normal operating conditions; excess or reduced demand from the accessory system 294; and other flow dynamics of the compressor 200, such as crossflows, vortices, swirls, boundary layer interruptions, and the like. In general, the bleed inlet 260 is positioned and sized to enable low loss, high recovery axi-symmetric flow removal with respect to both the secondary air flow 252 and the primary air flow 204. In addition to the other functions discussed below, the secondary air flow 252 removed at the bleed inlet 260 may mitigate or prevent overpressurization or surge that may occur in this area of the primary air flow path 202.

As described above, the secondary air flow 252 removed from the primary air flow path 202 flows through the bleed inlet 260 into the plenum 270. The plenum 270 is sized and shaped to provide a low loss transition for the secondary air flow 252. Particularly, the plenum 270 is configured to prevent or mitigate any vortices, cross flow or distortions in communicating air flows between the plenum 270 and the bleed inlet 260, the exhaust conduit 292, the accessory conduit 294, and the injection openings 280. As an example, the bleed inlet 260 may be sized such that the Mach number through the inlet 260 is less than 0.15 at a maximum engine flow rate. Although not shown, one or more of the mechanisms for active control may be provided for any of the components of the secondary air flow system 250. For example, valves or the like may be provide at one or more of the bleed inlet 260, exhaust conduit 292, accessory conduit 294, and injection openings 280 to regulate the amount of air flow therethrough.

As shown in FIG. 2, a first portion 254 of the secondary air flow 252 flows into the exhaust conduit 292, and a second portion 256 of the secondary air flow 252 flows into the accessory conduit 296 in manner to reduce or mitigate pressure losses. The first portion 254 of the secondary air flow 252 generally corresponds to any portion of air not required in other areas of the secondary air flow system 250 or the gas turbine engine 100 (FIG. 1), e.g., excess air that may result from reduced demand in the accessory system 294 or surge conditions at engine start-up.

Figure 3:
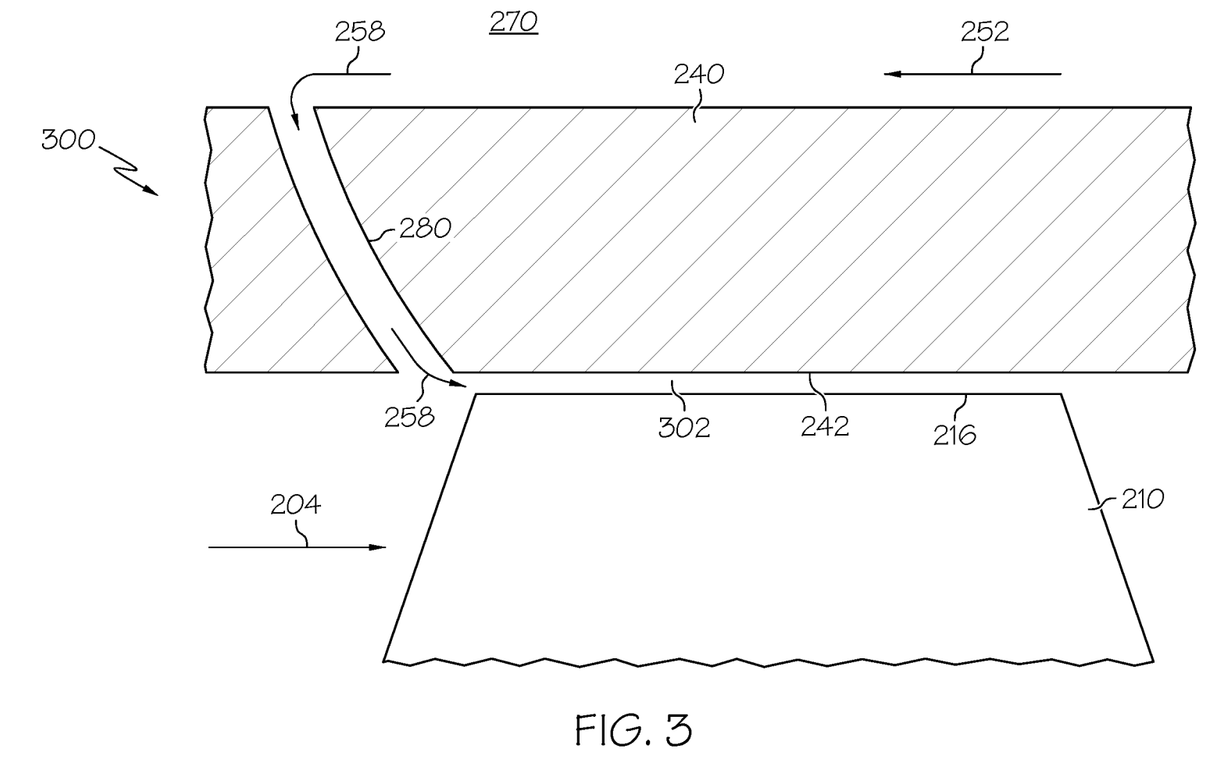
FIG. 3 is a more detailed cross-sectional view of a portion of the compressor of FIG. 2 in accordance with an exemplary embodiment.

A third portion 258 of the secondary air flow 252 flows into the injection openings 280. The injection openings 280 are more clearly shown in FIG. 3, which depicts a more detailed portion 300 of the compressor 200 of FIG. 2. Particularly, FIG. 3 shows the injection openings 280 that direct the third portion 258 of the secondary air flow 252 (FIG. 2) towards the gap 302 between the casing 240 and the tip 216 of the rotor blade 210. Such injection openings 280 may be machined directly into the end wall 242 or designed as a discrete insert into the end wall 242. The injection openings 280 may be slots arranged in an axi-symmetric pattern.

As noted above, primary air flow 204 leaking into the gap 302 may form flow variations, such as vortices, that may otherwise disrupt the primary air flow 204 between the tip 216 and end wall 242. In particular, the injection openings 280 tend to reduce the impact of flow variations at desired areas. For example, the injection openings 280 function to energize any slow moving or low pressure air within or at the gap 302 with minimal disturbances of the primary air flow 204.

In general, the injection openings 280 may have any suitable configuration, as well as any suitable height, width, length, separation, and cross-sectional shape (not shown). Design constraints may be determined, for example, with computational fluid dynamics (CFD) analysis. In general, the particular dimensions and arrangement of the injection openings 280 are selected in order to obtain the desired performance or stall margin characteristics. Accordingly, the third portion 258 of the secondary air flow 252 reduces the influence of the air that leaks through the gap 302 and results in an increase in the efficiency and/or the stall margin of the compressor 200.

Returning to FIG. 2, the plenum 270 may be sized to support the functions described herein, including receiving secondary air flow 252 through the bleed inlet 260 and supplying air to the exhaust conduit 292, accessory conduit 294, and injection openings 280 without impact to one another during high demand operations. In particular, the plenum 270 may be sized to provide the same supply pressure to exhaust conduit 292, accessory conduit 294, and/or injection openings 280 regardless of the individual flow rates.

In one exemplary embodiment, the plenum 270 is sized such that the average Mach number within the plenum 270 (e.g. air flows 252) is less than 0.05 at the largest air flow rate through the plenum 270. In some embodiments, local air flows, such as those immediately upstream of the injection slots 280, exhaust conduit 292, or accessory conduit 294 may be greater than 0.05 Mach, although typically, the average Mach number is less than 0.05. In general, the size of the plenum 270 and resulting lower air flow rates enable the plenum 270 to service the injection slots 280, exhaust conduit 292, and accessory conduit 294 without substantial pressure losses in the plenum 270.

In a further embodiment, the plenum 270 may be sized such that the distance 276 between the exhaust conduit 296 and the bleed inlet 260 is greater than twice the width 266 of the bleed inlet 260. If the bleed inlet 260 is formed by holes, the distance 278 between the accessory conduit 296 and the bleed inlet 260 is greater than twice the hydraulic diameter of the bleed inlet 260. In another exemplary embodiment, the plenum 270 may be sized such that the distance 276 between the exhaust conduit 292 and the bleed inlet 260 is also greater than twice the width 266 of the bleed inlet 260. Additional details about the size of the plenum 270 and arrangement of the accessory conduit 296 and the exhaust conduit 292 are discussed below in reference to FIG. 4.

Figure 4:
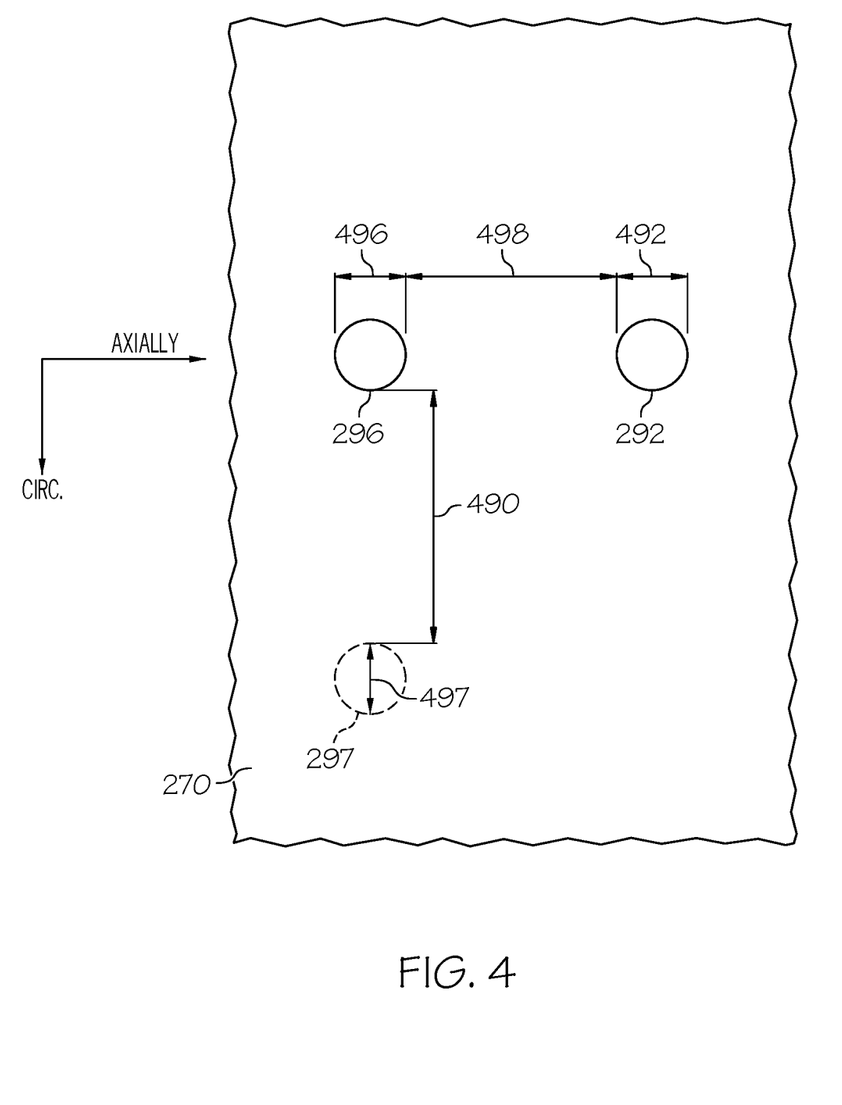
FIG. 4 is a partial plan view of the compressor of FIG. 2 in accordance with an exemplary embodiment.

FIG. 4 is a partial plan view of the compressor of FIG. 2 in accordance with an exemplary embodiment and particularly corresponds to a plan view of a portion of plenum 270 along line 4-4 in FIG. 2. FIG. 4 illustrates the relative position of the accessory conduit 296 and the exhaust conduit 292. As shown, the accessory conduit 296, the exhaust conduit 292, and the plenum 270 are configured such that the accessory conduit 296 and the exhaust conduit 292 are spaced axially apart from each other at a distance 498 that is at least three times the diameter 496 of the accessory conduit 296 and at least three times the diameter 492 of the exhaust conduit 292. FIG. 4 also illustrates a second accessory conduit 297 in the plenum 270, which may be fluidly coupled to the accessory system 294 discussed above or to another accessory system (not shown). In any event, the second accessory conduit 297 may be spaced apart from the accessory conduit 296 at a distance 490 that is at least three times the diameter 496 of the accessory conduit 297 and at least three times the diameter 497 of the second accessory conduit 297. In FIG. 4, the distance 490 of the spacing between the first and second accessory conduits 296 and 297 is a circumferential distance, although such accessory conduits 296 and 297 may also be spaced apart from one another at a similar spacing in an axial direction. This spacing enables the off-takes to be free from interference from one another.

Although FIG. 4 depicts the openings or off-takes of the conduits 292, 296, and 297 as being circular, other shapes may be provided. As used herein the term "diameter" may refer to the hydraulic diameter of the openings or off-takes of the conduits 292, 296, and 297. In one exemplary embodiment, such a diameter may be calculated as set forth in Equation (1):

$$\text{Hydraulic Diameter} = (4*\text{area})/\text{Perimeter} \tag{1}$$

The size of the plenum 270 and spacing of the bleed inlet 260, accessory conduit 296, exhaust conduit 292, and injection openings 280 provide a number of benefits. Particularly, this enables the plenum 270 to service the accessory conduit 296, exhaust conduit 292, and injection openings 280 at a suitable pressure regardless of the flow rates at various engine operating conditions, e.g., since velocities are low, available pressure will generally not be influenced. As such, the injection openings 280 and accessory conduit 296 may be designed for a predetermined, constant pressure.

As such, exemplary embodiments discussed herein integrate elements that provide pneumatic power and cooling air with elements that improve stall margin. This enables a higher efficiency operation at higher pressures and/or enhanced safety. The secondary air flow system 250 improves efficiency by addressing flow variations while additionally functioning to provide pneumatic power or cooling air to accessory system 294 in an integrated system, thereby reducing cost and complexity of manufacturing, installing, and maintaining engines used in aircraft and other platforms that require auxiliary power generation.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:
1. A compressor for a gas turbine engine, comprising:
a first stator;
a rotor platform positioned downstream of the first stator;
an exit stator positioned downstream of the rotor platform;
a rotor blade extending radially outwardly from the rotor platform, the rotor blade including a pressure sidewall and a circumferentially opposing suction sidewall extending in a radial direction between a root and a tip and in an axial direction between a leading edge and a trailing edge;
a casing having an inner surface surrounding the tip and spaced radially outwardly from the tip to define a gap between the casing and the tip, the casing and the rotor platform defining a primary air flow path between the casing and the rotor platform to direct a primary air flow in a direct air in a downstream direction;
a secondary air flow system comprising:
a bleed inlet disposed in the inner surface of the casing downstream of the rotor blade and configured to remove secondary air flow from the primary air flow;
an injection opening disposed in the inner surface of the casing upstream of the bleed inlet;
an accessory conduit configured to be fluidly coupled to an accessory system of the gas turbine engine; and
a plenum fluidly coupled to the bleed inlet, the injection opening, and the accessory conduit,
wherein the bleed inlet and plenum at least partially define a secondary air flow path for the secondary air flow such that a first portion of the secondary air flow is directed in through the bleed inlet, through the plenum, and out through the injection opening and a second portion of the secondary air flow is directed in through the bleed inlet, through the plenum, and out through the accessory conduit; and
an impeller positioned downstream of the rotor blade and the casing and immediately downstream of the exit stator, the bleed inlet being arranged between the exit stator and the impeller.

2. The compressor of claim 1, wherein the injection opening is configured to direct the first portion of secondary air flow into a gap between the rotor blade and the casing.

3. The compressor of claim 1, wherein the bleed inlet is sized to remove the secondary air flow at a flow rate of less than 0.15 Mach at a maximum flow rate of the primary air flow.

4. The compressor of claim 1, wherein the plenum is sized such that the secondary air flow has a flow rate of less than 0.05 Mach within the plenum.

5. The compressor of claim 1, wherein the plenum is sized such that a distance between the accessory conduit and the bleed inlet is greater than twice a width of the bleed inlet.

6. The compressor of claim 1, wherein the accessory conduit is a first accessory conduit, and wherein secondary air flow system further comprises a second accessory conduit fluidly coupled to the plenum for receiving a third portion of the secondary air flow.

7. The compressor of claim 6, wherein the first accessory conduit has a first diameter and the second accessory conduit has a second diameter, the first accessory conduit being spaced from the second accessory conduit at a distance at least three times greater than the first diameter.

8. The compressor of claim 7, wherein the distance is at least three times greater than the second diameter.

9. The compressor of claim 1, wherein the gas turbine engine is arranged on an aircraft, and wherein the secondary air flow system further comprises an exhaust conduit in fluid communication with the plenum and configured to direct a third portion of the secondary air flow from the plenum to an aircraft exhaust system that dumps the third portion of the secondary air flow overboard the aircraft.

10. The compressor of claim 9, wherein the plenum is sized such that a distance between the exhaust conduit and the bleed inlet is greater than twice a width of the bleed inlet.

11. The compressor of claim 9, wherein the accessory conduit has a first diameter and the exhaust conduit has a second diameter, the accessory conduit being spaced from the exhaust conduit at a distance at least three times greater than the first diameter.

12. The compressor of claim 11, wherein the distance is at least three times greater than the second diameter.

13. The compressor of claim 9, wherein the plenum is a common plenum directly connected to the bleed inlet, the injection opening, the accessory conduit, and the exhaust conduit.

14. The compressor of claim 1, wherein the bleed inlet has a leading inlet edge that is angled in an upstream direction.

15. A gas turbine engine assembly, comprising:
a compressor section comprising:
a rotor platform;
a rotor blade extending radially outwardly from the rotor platform, the rotor blade including a pressure sidewall and a circumferentially opposing suction sidewall extending in a radial direction between a root and a tip and in an axial direction between a leading edge and a trailing edge; and
a casing having an inner surface surrounding the tip and spaced radially outwardly from the tip to define a gap between the casing and the tip, the casing and the rotor platform defining a primary air flow path between the casing and the rotor platform to direct a primary air flow in a direct air in a downstream direction;

an exhaust section fluidly coupled to the compressor section; and a secondary air flow system comprising:
 a bleed inlet disposed in the inner surface of the casing downstream of the rotor blade and configured to remove secondary air flow from the primary air flow;
 an injection opening disposed in the inner surface of the casing upstream of the bleed inlet;
 an exhaust conduit fluidly coupled to the exhaust system;
 a plenum fluidly coupled to the bleed inlet, the injection opening, and the exhaust conduit,
 wherein the bleed inlet and plenum at least partially define a secondary air flow path for the secondary air flow such that a first portion of the secondary air flow is directed in through the bleed inlet, through the plenum, and out through the injection opening and a second portion of the secondary air flow is directed in through the bleed inlet, through the plenum, and out through the exhaust conduit to the exhaust section; and wherein the compressor section further comprises an impeller positioned downstream of the rotor blade and the casing, the bleed inlet being arranged upstream of the impeller, and an exit stator downstream of the rotor platform and immediately upstream of the impeller, and wherein the bleed inlet is arranged between the exit stator and the impeller.

16. The gas turbine engine assembly of claim 15, wherein the injection opening is configured to direct the first portion of secondary air flow into a gap between the rotor blade and the casing.

17. The gas turbine engine assembly of claim 15, further comprising an accessory system fluidly coupled to the compressor, and wherein the secondary air flow system further comprises
 an accessory conduit extending between the plenum and the accessory system such that a third portion of the secondary air flow is directed in through the bleed inlet, through the plenum, and out through the accessory conduit to the accessory system,
 wherein the plenum is sized such that a distance between the accessory conduit and the bleed inlet is greater than twice a width of the bleed inlet.

18. The gas turbine engine assembly of claim 17, wherein the accessory conduit has a first diameter and the exhaust conduit has a second diameter, the accessory conduit being spaced from the exhaust accessory conduit at a distance at least three times greater than the first diameter.

19. A compressor for a gas turbine engine, comprising:
 a first stator;
 a rotor platform positioned downstream of the first stator;
 an exit stator positioned downstream of the rotor platform;
 a rotor blade extending radially outwardly from the rotor platform, the rotor blade including a pressure sidewall and a circumferentially opposing suction sidewall extending in a radial direction between a root and a tip and in an axial direction between a leading edge and a trailing edge;
 a casing having an inner surface surrounding the tip and spaced radially outwardly from the tip to define a gap between the casing and the tip, the casing and the rotor platform defining a primary air flow path between the casing and the rotor platform to direct a primary air flow in a direct air in a downstream direction;
 a secondary air flow system comprising:
  a bleed inlet disposed in the inner surface of the casing downstream of the rotor blade and configured to remove secondary air flow from the primary air flow;
  a plenum fluidly receiving the secondary air flow from the bleed inlet;
  an injection opening disposed in the inner surface of the casing upstream of the bleed inlet and fluidly coupled to the plenum for directing a first portion of secondary air flow from the plenum into a gap between the rotor blade and the casing;
  an accessory conduit fluidly coupled to the plenum for directing a second portion of secondary air flow from the plenum to an accessory system of the gas turbine engine; and
  an exhaust conduit fluidly coupled to the plenum for directing a third portion of secondary air flow from the plenum to an aircraft exhaust system; and
 an impeller positioned downstream of the rotor blade and the casing and immediately downstream of the exit stator, the bleed inlet being arranged between the exit stator and the impeller.

* * * * *